(12) United States Patent
Lee (10) Patent No.: US 10,124,392 B2
(45) Date of Patent: Nov. 13, 2018

(54) PIPE FLARE PROCESSING DEVICE HAVING A VIEW HOLE

(71) Applicant: Tai-Hung Lee, Taichung (TW)

(72) Inventor: Tai-Hung Lee, Taichung (TW)

( * ) Notice: Subject to any disclaimer, the term of this patent is extended or adjusted under 35 U.S.C. 154(b) by 280 days.

(21) Appl. No.: 14/930,637

(22) Filed: Nov. 2, 2015

(65) Prior Publication Data

US 2016/0136718 A1 May 19, 2016

(30) Foreign Application Priority Data

Nov. 19, 2014 (TW) .................................. 103140125

(51) Int. Cl.
*B21D 41/02* (2006.01)
*B29C 57/04* (2006.01)

(52) U.S. Cl.
CPC ......... *B21D 41/026* (2013.01); *B21D 41/021* (2013.01); *B29C 57/04* (2013.01)

(58) Field of Classification Search
CPC ...... B21D 39/20; B21D 41/02; B21D 41/021; B21D 41/026; B23P 11/005; B23P 19/10; B23P 19/12; B29C 57/04
See application file for complete search history.

(56) References Cited

U.S. PATENT DOCUMENTS

| | | | | |
|---|---|---|---|---|
| 2,090,660 A * | 8/1937 | Arndt | ................... | B21D 41/021 72/116 |
| 2,297,885 A * | 10/1942 | Graf | ..................... | B21D 41/021 72/318 |
| 2,302,794 A * | 11/1942 | Neukirch | ............. | B21D 41/021 72/317 |
| 2,737,225 A * | 3/1956 | Jasinski | ............... | B21D 41/021 408/104 |
| 3,044,530 A * | 7/1962 | Jones | ................... | B21D 41/021 269/189 |
| 3,109,479 A * | 11/1963 | Wolcott | ............... | B21D 41/021 72/317 |
| 3,466,707 A * | 9/1969 | Click | ................... | B21D 41/021 425/193 |
| 3,992,123 A * | 11/1976 | Uyetake | ................. | B23B 5/163 408/104 |
| 4,526,023 A * | 7/1985 | Babb | .................... | B21D 41/021 72/116 |
| 4,535,616 A * | 8/1985 | Eason | .................... | B21D 41/02 72/116 |
| 4,779,441 A * | 10/1988 | Pringle | ................ | B21D 41/021 72/316 |

(Continued)

*Primary Examiner* — Edward Tolan
(74) *Attorney, Agent, or Firm* — Cheng-Ju Chiang (57) ABSTRACT

The present invention includes a mold set, a deformation generating element, and an engaging element. The mold set has a pipe storing channel, a deformation portion, and a positioning recess. The deformation generating element has a deformation generating portion and a pushing portion with an outer working thread. The engaging element has an axial positioning portion and a working channel with an inner working thread. Therefore, the deformation generating portion can move toward the deformation portion for pipe flare processing work and a view hole is provided for viewing. So, no threaded hole is required for the mold set. The view hole allows the user to inspect the pipe end's position being correct or not. The manufacturing for the engaging element is easy. The engaging element has a guiding function.

1 Claim, 6 Drawing Sheets

(56) References Cited

U.S. PATENT DOCUMENTS

| | | | | |
|---|---|---|---|---|
| 6,199,421 B1* | 3/2001 | Ploeger | ............... | B21D 41/021 |
| | | | | 72/317 |
| 6,530,256 B1* | 3/2003 | Irie | ............... | B21D 41/02 |
| | | | | 72/316 |
| 8,997,325 B2* | 4/2015 | Williams | ............... | F16L 19/103 |
| | | | | 285/332.3 |
| 9,044,803 B1* | 6/2015 | Propst | ............... | B21D 41/02 |
| 2004/0083785 A1* | 5/2004 | Klann | ............... | B21D 19/08 |
| | | | | 72/316 |
| 2004/0187543 A1* | 9/2004 | Frigo | ............... | F16L 25/0036 |
| | | | | 72/316 |
| 2013/0025341 A1* | 1/2013 | Ciprich | ............... | F16L 19/045 |
| | | | | 72/352 |

* cited by examiner

PIPE FLARE PROCESSING DEVICE HAVING A VIEW HOLE

BACKGROUND OF THE INVENTION

1. Field of the Invention

The present invention relates to a pipe flare tool, especially to a pipe flare processing device having a view hole. It has the following advantages and functions. No threaded hole is required for the mold set. The view hole allows the user to inspect the pipe end's position being correct or not. The manufacturing for the engaging element is easy. The engaging element has a guiding function. Therefore, this invention can solve the traditional problems such as inconvenient and complicated replacing procedure as well as time-consuming problem.

2. Description of Related Art

Figure 9:
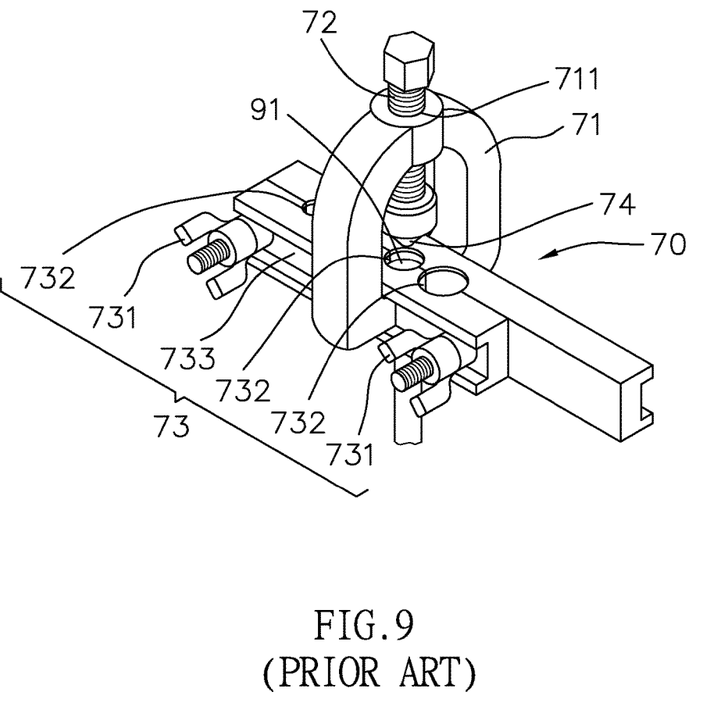
FIG. 9 is a perspective view of the traditional device.

As illustrated in FIG. 9, a traditional flaring apparatus 70 (or called traditional tube flare apparatus) is disclosed. It includes a body 71, a threaded bolt 72, a tube securing portion 73, and a flaring element 74. The tube securing portion 73 contains a pair of adjusting portions 731, several clamping channels 732, and the guiding slots 733. This body 71 can slide along the guiding slots 733. The adjusting portions 731 can limit its moving range. The body 71 has a threaded bore 711. This threaded bolt 72 can be positioned in this threaded bore 711. The flaring element 74 is disposed on one end of the threaded bolt 72.

About the operation of the traditional flaring device 70, a pipe 91 is placed in one of the clamping channels 732 first. Then, the user can adjust the adjusting portions 731 about the size of the clamping channel 732. Thus, the pipe 91 is fixed in the selected clamping channel 732.

Finally, the user can rotate the threaded bolt 732 to force the flaring element moving 731 toward the direction of the clamping channel 732. So, it can conduct the pipe flare processing related works on the pipe 91.

However, when the user wants to change the flaring element 74, one of the adjusting portions 731 must be taken off, so as to allow the body 71 to be removed from the guiding slots 733. Hence, the body 71 is separated from the tube securing portion 73. Then, the flaring element 74 can be replaced by another one. That is a very inconvenient and complicated procedure. It is time-consuming as well.

Under such condition, it is necessary to develop a new device to overcome the afore-mentioned problems.

SUMMARY OF THE INVENTION

The object of this invention is to provide a pipe flare processing device having a view hole containing the following advantages and functions. No threaded hole is required for the mold set. The view hole allows the user to inspect the pipe end's position being correct or not. The manufacturing for the engaging element is easy. The engaging element has a guiding function. Therefore, this invention can solve the traditional problems such as the inconvenient and complicated replacing procedure as well as the time-consuming problem.

In order to achieve the object and solve the above-mentioned problem, this invention is provided. A pipe flare processing device having a view hole comprising:

a mold set having an upper half mold, a lower half mold, and a plurality of securing elements;

the upper half mold having an upper half pipe storing channel, an upper half deformation portion, an upper half positioning portion, a plurality of upper securing holes, and an upper view hole;

the lower half mold having a lower half storing channel, a lower half deformation portion, a lower half positioning portion, a plurality of lower securing hole, and a lower half view hole; the upper half mold and the lower half mold being assembled; the upper half storing channel and the lower half storing channel forming a pipe storing channel; the upper half deformation portion and the lower half deformation portion forming a deformation portion; the upper half positioning portion and the lower half positioning portion forming a positioning recess; the upper half securing holes and the lower half securing holes forming a plurality of securing holes so that the securing elements are able to lock through so as to make the upper half mold and the lower half mold be secured together; and the upper view hole and the lower view hole forming a view hole;

a deformation generating element having at least one deformation generating portion and at least one pushing portion, the pushing portion being disposed with an outer working thread;

an engaging element having an axial positioning portion and working channel, the axial positioning portion being provided for axially securing the engaging element in the positioning recess; the working channel being axially disposed inside the engaging element and having an inner working thread that is able to match with the outer working thread of the pushing portion, so the deformation portion can move through;

so that the deformation generating portion is able to move along a direction toward the deformation portion to conduct a pipe flare processing work and the view hole being provided for viewing an inner portion of the mold set.

DETAILED DESCRIPTION OF THE INVENTION

Figure 1:
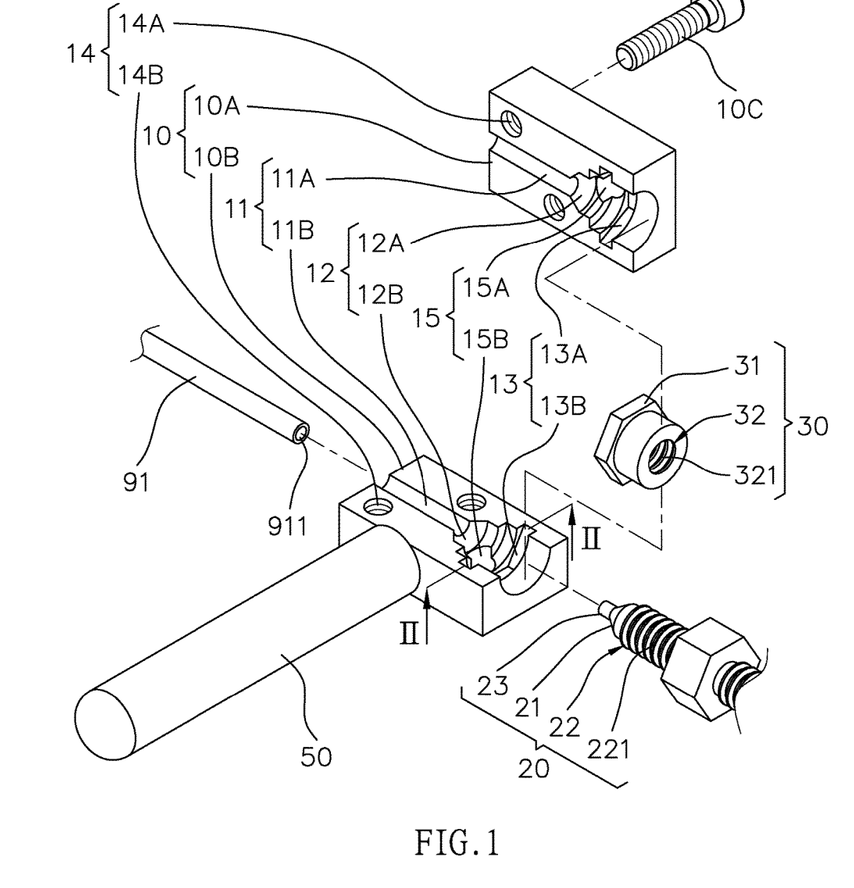
FIG. 1 is an exploded view of the present invention.
Figure 2:
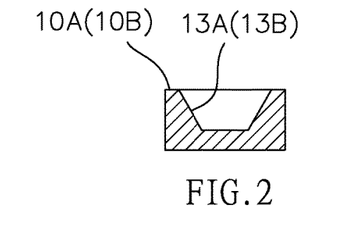
FIG. 2 is a cross-sectional view of the positioning recess of this invention.

Referring to FIGS. 1 and 2, the present invention relates to a pipe flare processing device having a view hole. It comprises a mold set 10, a deformation generating element 20, and an engaging element 30.

With regard to the mold set 10, it has an upper half mold 10A, a lower half mold 10B, and several securing elements 10C.

The upper half mold 10A has an upper half pipe storing channel 11A, an upper half deformation portion 12A, an upper half positioning portion 13A, a plurality of upper securing holes 14A, and an upper view hole 15A.

The lower half mold 10B has a lower half pipe storing channel 11B, a lower half deformation portion 12B, a lower half positioning portion 13B, a plurality of lower securing holes 14B, and a lower view hole 15B.

The upper half mold 10A and the lower half mold 10B can be assembled. The upper half storing channel 11A and the lower half storing channel 11B form a pipe storing channel 11. The upper half deformation portion 12A and the lower half deformation portion 12B form a deformation portion 12. The upper half positioning portion 13A and the lower half positioning portion 13B form a positioning recess 13. The upper half securing holes 14A and the lower half securing holes 14B form a plurality of securing holes 14 so that the securing elements 10C can lock through so as to make the upper half mold 10A and the lower half mold 10B can be secured together. Furthermore, the upper view hole 15A and the lower view hole 15B are co-axially aligned and combined to form a view hole 15 which is substantially perpendicular to the pipe storing channel 11 and penetrates the mold set 10.

Concerning this deformation generating element 20, it has at least one deformation generating portion 21 and at least one pushing portion 22. The pushing portion 22 is disposed with an outer working thread 221.

About the engaging element 30, it has an axial positioning portion 31 and a working channel 32. The axial positioning portion 31 is provided for axially securing the engaging element 30 in the positioning recess 13 so that the engaging element 30 is fixed and positioned inside the mold set 10. The working channel 32 is axially disposed inside the engaging element 30 and has an inner working thread 321 that is able to match with the outer working thread 221 of the pushing portion 22, so the pushing portion 22 can move toward the deformation portion 12.

Therefore, the deformation generating portion 21 is able to move along a direction toward the deformation portion 12 to conduct a pipe flare processing and the view hole 15 is provided for viewing an inner portion of the mold set 10.

Practically, the pipe storing channel 11 can store and secure a pipe 91. This pipe 90 has a pipe end 911 which is positioned inside the deformation portion 12 and can be inspected via the view hole 15.

The securing elements 100 could be screws, bolts or the like.

The axial positioning portion 31 is a hexagonal screw head structure. Moreover, the axial positioning portion 31 must have at least one pair of parallel flat surfaces for engaging with the positioning recess 13. Of course, it could be four surfaces, eight surfaces or more.

About the FIG. 2, after the upper half positioning portion 13A and the lower half positioning portion 13B is assembled, the positioning recess 13 is formed. The positioning recess 13 is able to engage with the axial positioning portion 31. The positioning recess 13 is shaped as a recessed hexagonal hole corresponding with the axial positioning portion 31 so as to limit a rotation of the axial positioning portion 31. About the positioning recess 13, the hexagonal recess can be modified to square or other shape that has at least one pair of parallel surfaces.

The deformation generating portion 21 is able to move along a direction toward the deformation portion 12 to conduct a pipe flare processing or relates works (bending, re-shaping, etc.).

The deformation generating element 20 further comprises a guiding portion 23 formed on an end of the deformation generating portion 22 so as to protrude in the deformation generating portion 21 to conduct a pipe flare processing for the pipe end 911.

The deformation generating portion 21 having two ends.

Two pushing portions 22 and two guiding portions 23 are disposed on both ends respectively of the deformation generating portion 21.

However, the deformation generating portion 21 can be modified as only one end that has one pushing portion 21 and one guiding portion 23. That is, only one end has such function for pipe flare processing function.

There are many deformation generating elements 20. Each deformation generating element 20 could be designed a0:

[a] the deformation generating portion 21 has different angle (such as for 30 degrees, 45 degrees pipe flaring) and has different size (such as for metric units or imperial units). Furthermore, the pipe flare processing contains many works such as pipe end deformation, tube expanding, special pipe end deformation or reshaping, etc., all known technology).

[b] The size of the pushing portion 22 should be changed according to the size of the deformation generating portion 21 (for example, larger or smaller).

The engaging element 30 should match with the deformation generating element 20 in quantity. Also, the working channel 32 should match the size and shape of the deformation generating portion 21 (for example, larger or smaller).

In addition, the outer working thread 221 should match with the inner working thread 321 (such as both coarse threads or both fine threads). Of course, they should match each other.

Figure 5A:
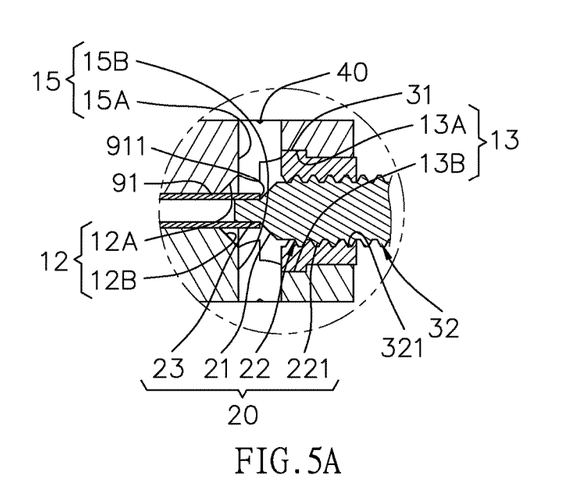
FIG. 5A is an enlarged view showing the end of the pipe before the pipe flare processing work.
Figure 5B:
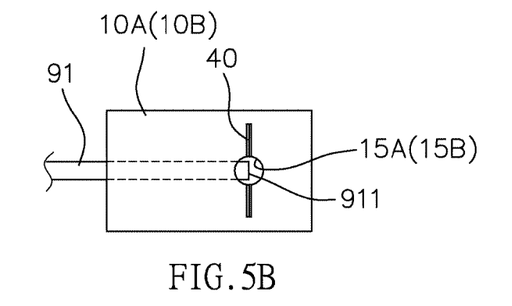
FIG. 5B is a top view about the portion shown in FIG. 5A.

Referring to FIGS. 5A and 5B, this invention can include marks 40 that are formed on both the outer surfaces of the upper half mold 10A and of the lower half mold 10B. The marks 40 can indicate the center of the upper view hole 15A and the lower view hole 15B for allowing the user can inspect whether the pipe end 911 moving to the right position or not for pipe flare processing work.

Also, a handle 50 can be disposed perpendicularly on the upper half mold 10A or on the lower half mold 10B as an integral structure so as to make the user to hold this invention conveniently.

Figure 3:
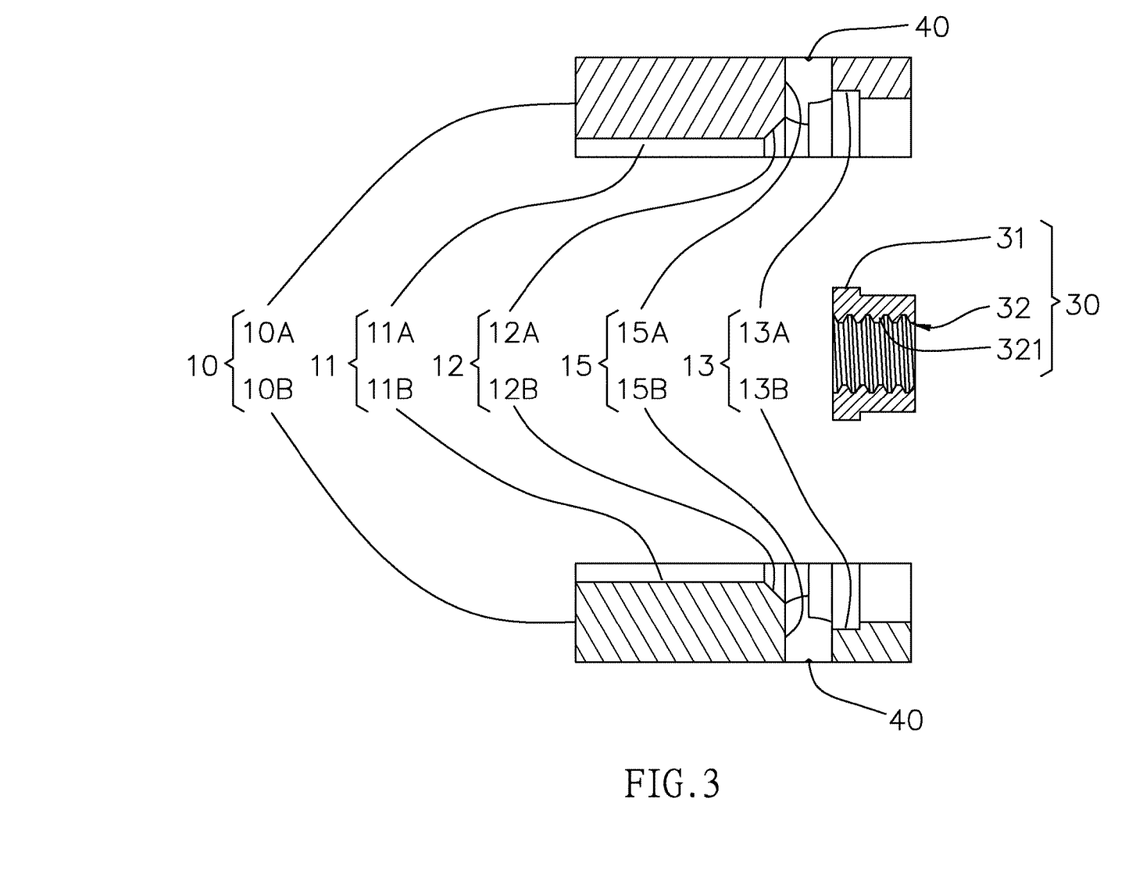
FIG. 3 is a cross-sectional view of a portion in FIG. 1.

As illustrated in FIG. 3, the operation procedures can be described as follows.

Figure 4:
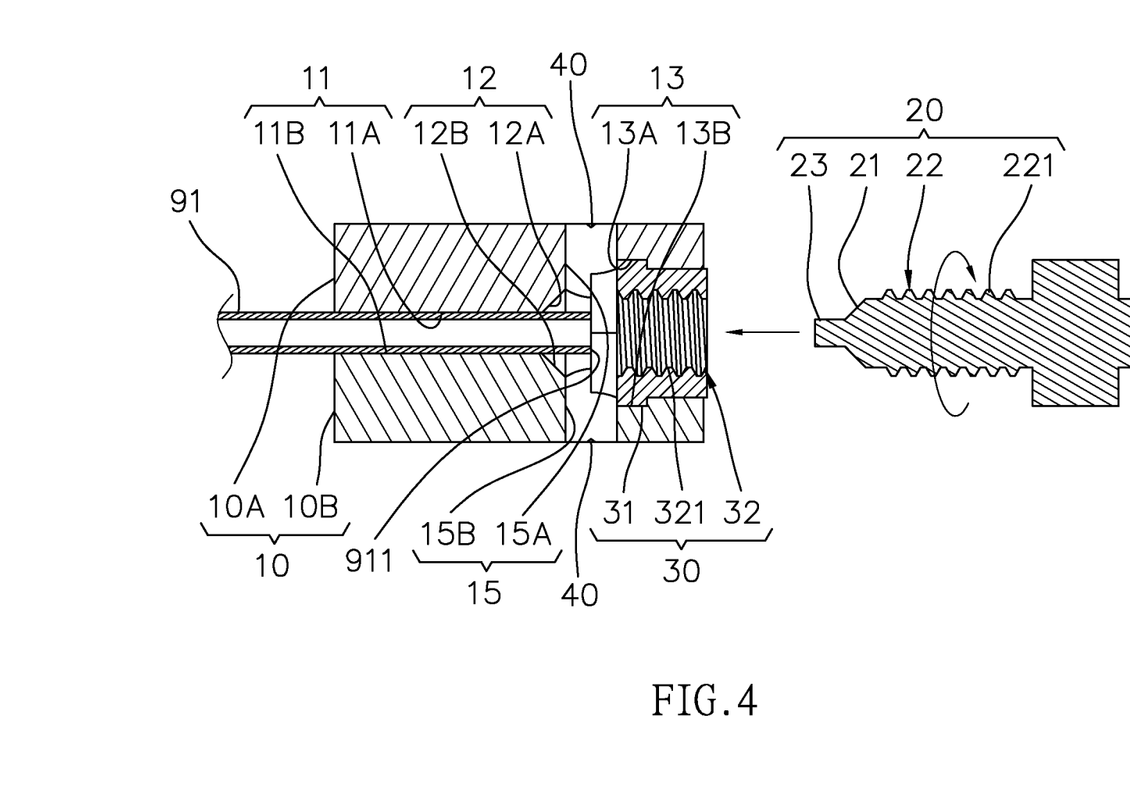
FIG. 4 is a cross-sectional view in FIG. 1 in which the separated parts are assembled.
Figure 6A:
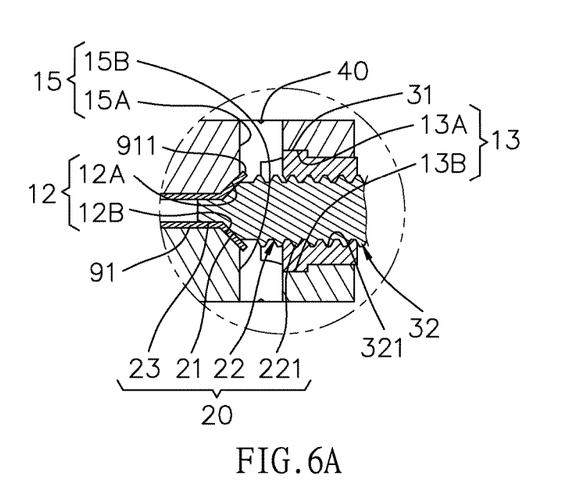
FIG. 6A is an enlarged view showing the end of the pipe after the pipe flare processing work.
Figure 6B:
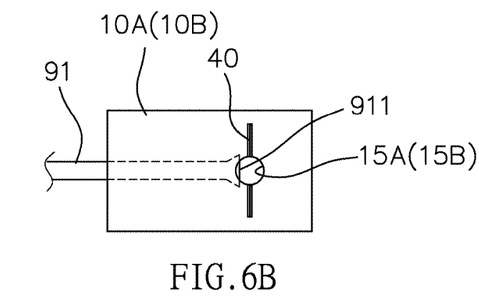
FIG. 6B is a top view about the portion shown in FIG. 6A.

First, the engaging element 30 is placed between the upper half mold 10A and the lower half mold 10B. Next, the pipe 91 is placed in the pipe storing channel 11. By inspecting through the view hole 15, the user can make sure the pipe end 911 reaching the right position or not (inside the deformation portion 12), as shown in FIGS. 4, 5A and 5B. Then, after assembling the upper half mold 10A and the lower half mold 10B together, the user should lock them tightly by these securing elements 14 through the securing holes 15, so that the mold set 10 is locked. The axial positioning portion 31 is axially secured in the positioning recess 13 (cannot rotate). Put the deformation generating element 20 in the working channel 32. The outer working thread 221 of the pushing portion 22 is threaded with the inner working thread 321 of the engaging element 30. During the threading in process, the guiding portion 23 is protruded in the pipe end 911 as illustrated in FIG. 5A. Hence, the deformation generating portion 21 is able to conduct a pipe flare processing work on this pipe end 911 (can be seen in FIGS. 6A-6B).

Figure 7:
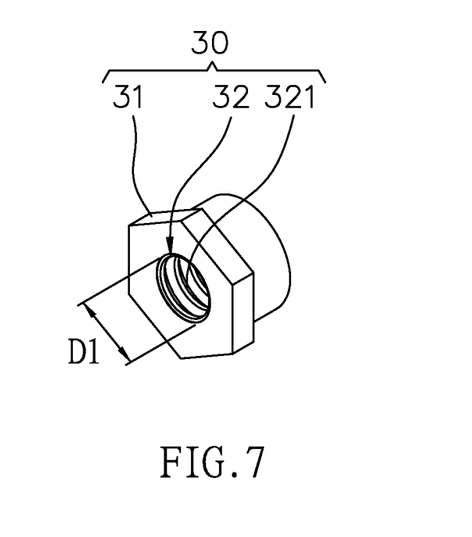
FIG. 7 is a perspective view showing the working channel of this invention has a first diameter.
Figure 8:
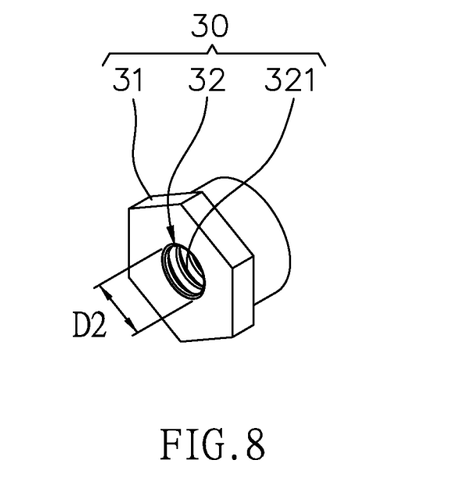
FIG. 8 is a perspective view showing the working channel of this invention has a second diameter.

Because the variety of products, there are many different types of pipe flare processing works. The key point is this invention has a positioning recess 13 in the mold set 10. Thus, it can provide different deformation generating elements 20 can be used so as to fit specific needs about such pipe flare processing works. The deformation generating element 20 is changeable. Each deformation generating element 20 has a working channel 32. As shown in FIG. 7, the working channel 32 has a first diameter D1. In FIG. 8, the working channel 32 has a second diameter D2 which is smaller than the first diameter D1. So, suitable deformation generating element 20 with proper outer working thread can be screwed in. That is, only the deformation generating element 20 and the corresponding engaging element 30 are needed to be changed, the mold set 10 is the same (no change is needed). Therefore, it is very convenient.

Under such condition, please note:

First, just locking the upper half mold 10A and the lower half mold 10B together is required. No precise positioning procedure is required.

Second, the function of the securing hole 14 is to lock the upper half mold 10A and the lower half mold 10B.

Third, the engaging element 30 is placed between the upper half mold 10A and the lower half mold 10B. It also can guide the matching position about the upper half mold 10A and the lower half mold 10B.

The advantages and the functions of this invention can be summarized as follows.

[1] No threaded hole is required for the mold set. In our invention, there is no threaded hole in the upper half mold nor the lower half hold. The pipe storing channel and the positioning recess can be manufactured by general machining technique easily. The securing hole is easy to be manufactured. So, No threaded hole is required for the mold set

[2] The view hole allows the user to inspect the pipe end's position is correct or not. Because there is the design of view hole, it is easy to check whether the pipe end moving to a right position or not (for starting a pipe flare processing). It is extremely convenient.

[3] The manufacturing for the engaging element is easy. Once the upper half mold is placed on the lower half mold, it just needs to make the engaging element being positioned in the positioning recess. The required machining technology is relatively low. So, the manufacturing for the engaging element is easy.

[4] The engaging element has a guiding function. The engaging element is placed between the upper half positioning portion and the lower half positioning portion. Also, the upper and the lower half positioning portions are just positioned between the upper and the lower half molds. Therefore, it can guide the upper and the lower half molds to be locked together. Thus, the engaging element has a guiding function.

[5] One mold set is suitable for different deformation generating elements with different threads. This invention is designed to make the engaging element replaceable. Every engaging element's thread can fit with the thread of the corresponding deformation generating element. Meanwhile, if the user needs different deformation generating element, the one only needs to change a suitable engaging element. It is not required to change the whole mold set. It is very convenient. One mold set is suitable for different deformation generating elements with different threads.

What is claimed is:

1. A pipe flare processing device having a view hole comprising:
   a mold set having an upper half mold, a lower half mold, and a plurality of securing elements;
   said upper half mold having an upper half pipe storing channel, an upper half deformation portion, an upper half positioning portion, a plurality of upper securing holes, and an upper view hole; and
   said lower half mold having a lower half storing channel, a lower half deformation portion, a lower half positioning portion, a plurality of lower securing holes, and a lower half view hole; said upper half mold and said lower half mold being assembled; said upper half storing channel and said lower half storing channel forming a pipe storing channel; said upper half deformation portion and said lower half deformation portion forming a deformation portion; said upper half positioning portion and said lower half positioning portion forming a positioning recess; said upper half securing holes and said lower half securing holes forming a plurality of securing holes so that said securing elements are able to lock through so as to make said upper half mold and said lower half mold be secured together; and said upper view hole and said lower view hole being co-axially aligned and combined to form a view hole which is substantially perpendicular to said pipe storing channel and penetrates said mold set;
   a deformation generating element having at least one deformation generating portion and at least one pushing portion, said pushing portion being disposed with an outer working thread; and
   an engaging element having an axial positioning portion and working channel, said axial positioning portion being provided for axially securing said engaging element in said positioning recess so that the engaging element is fixed and positioned inside the mold set; said working channel being axially disposed inside said engaging element and having an inner working thread that is able to match with said outer working thread of said pushing portion, so said pushing portion can move toward said deformation portion;
   marks that are formed on both the outer surfaces of the upper half mold and of the lower half mold, said marks being able to indicate the center of the upper view hole and the lower view hole for allowing the user can inspect whether the pipe end moving to the right position or not for pipe flare processing work; and
   a handle disposed perpendicularly on the upper half mold or on the lower half mold as an integral structure so as to make the user to hold the pipe flare processing device conveniently;
   wherein said deformation generating portion is able to move along a direction toward said deformation portion to conduct a pipe flare processing work and said view hole being provided for viewing an inner portion of said mold set;
   wherein said pipe storing channel can store a pipe that has a pipe end which is positioned inside said deformation portion and can be inspected via said view hole;
   wherein said securing element is a screw; and
   said axial positioning portion is a hexagonal screw head structure;
   said positioning recess is shaped as a recessed hexagonal hole corresponding with said axial positioning portion so as to limit a rotation of said axial positioning portion;
   said deformation generating element further comprises a guiding portion formed on an end of said deformation generating portion so as to protrude in said deformation generating portion to conduct a pipe flare processing work;

said deformation generating portion having two ends;
two pushing portions and two guiding portions are disposed on both ends respectively of said deformation generating portion;
wherein there are two deformation generating portions; and
wherein said deformation generating portions have different angles and sizes;
   said engaging elements match with the deformation generating elements in quantity;
   said working channel match the size and shape of the deformation generating portion.

\* \* \* \* \*